(12) United States Patent
Lee

(10) Patent No.: US 11,092,283 B2
(45) Date of Patent: Aug. 17, 2021

(54) ELECTRIC GREASE BARREL PUMP WITH AUTOMATIC SHIFT FUNCTION

(71) Applicant: AHWON CORPORATION, Gunpo-si (KR)

(72) Inventor: Juho Lee, Gunpo-si (KR)

(73) Assignee: AHWON CORPORATION, Gunpo-si (KR)

(*) Notice: Subject to any disclaimer, the term of this patent is extended or adjusted under 35 U.S.C. 154(b) by 311 days.

(21) Appl. No.: 16/309,100

(22) PCT Filed: Sep. 25, 2017

(86) PCT No.: PCT/KR2017/010521
§ 371 (c)(1),
(2) Date: Dec. 11, 2018

(87) PCT Pub. No.: WO2018/062783
PCT Pub. Date: Apr. 5, 2018

(65) Prior Publication Data
US 2019/0211967 A1    Jul. 11, 2019

(30) Foreign Application Priority Data
Sep. 29, 2016 (KR) .......................... 10-2016-0125454

(51) Int. Cl.
*F16N 13/22* (2006.01)
*F16N 25/00* (2006.01)
(Continued)

(52) U.S. Cl.
CPC .............. *F16N 13/22* (2013.01); *F16N 11/02* (2013.01); *F16N 25/00* (2013.01); *F16N 27/02* (2013.01);
(Continued)

(58) Field of Classification Search
CPC .... F16N 2013/063; F16N 25/00; F16N 27/02; F16N 2037/006
See application file for complete search history.

(56) References Cited

U.S. PATENT DOCUMENTS 2,810,496 A * 10/1957 Gray .......................... F16N 5/00
222/254
4,534,493 A * 8/1985 Sedran ................ B05C 11/1042
222/146.2
(Continued)

FOREIGN PATENT DOCUMENTS

JP      08-326993 A    12/1996
JP      2005-90597 A    4/2005
(Continued)

*Primary Examiner* — Michael R Mansen
*Assistant Examiner* — Mark K Buse
(74) *Attorney, Agent, or Firm* — Heedong Chae; Lucem, PC

(57) ABSTRACT

The present invention relates to an electric grease barrel pump that has a single pumping structure and has an automatic shift function performed by a manual operation of a valve for switching a grease supply line. The electric grease barrel pump comprises: a pumping means; a driving means; a supply pipe through which the grease is discharged from the pumping means; a distribution valve installed at an end of the supply pipe in a direction in which the grease is discharged; a magnetic switch, installed at a movable portion of the distribution valve, for outputting a signal for supplying the grease to a selected grease supply target of the plurality of grease supply targets according to an operating position of the movable portion; and a control unit for controlling the driving means to adjust grease discharge capability of the pumping means according to the signal of the magnetic switch.

4 Claims, 3 Drawing Sheets

(51) Int. Cl.
*F16N 13/06* (2006.01)
*F16N 27/02* (2006.01)
*F16N 11/02* (2006.01)
*F16N 37/00* (2006.01)

(52) U.S. Cl.
CPC .. *F16N 2013/063* (2013.01); *F16N 2037/006* (2013.01); *F16N 2200/12* (2013.01)

(56) References Cited

U.S. PATENT DOCUMENTS

| | | | | |
|---|---|---|---|---|
| 4,769,978 | A * | 9/1988 | Reichen | A01D 46/088 137/861 |
| 5,497,852 | A * | 3/1996 | Little | F16N 25/02 184/29 |
| 5,730,250 | A * | 3/1998 | Tsai | F16N 5/00 184/105.2 |
| 6,834,781 | B1 * | 12/2004 | Mueller | F16N 5/02 222/262 |
| 9,315,372 | B2 * | 4/2016 | Doi | F16N 11/10 |
| 9,855,574 | B2 * | 1/2018 | Beisel | F16N 11/10 |
| 9,909,714 | B2 * | 3/2018 | Kim | F16N 7/36 |
| 2006/0219482 | A1 * | 10/2006 | Tung | F16N 3/12 184/105.2 |
| 2013/0034458 | A1 * | 2/2013 | Ozeki | F16N 13/02 417/498 |
| 2016/0186928 | A1 * | 6/2016 | Holman | F16N 7/40 184/6 |

FOREIGN PATENT DOCUMENTS

| | | |
|---|---|---|
| KR | 10-2002-0039427 A | 5/2002 |
| KR | 10-0552400 B1 | 2/2006 |
| KR | 10-1364760 B1 | 2/2014 |

* cited by examiner

ELECTRIC GREASE BARREL PUMP WITH AUTOMATIC SHIFT FUNCTION

CROSS-REFERENCE TO RELATED APPLICATIONS

This application is based on and claims the benefit of priority to Korean Patent Application No. 10-2016-0125454 filed on Sep. 29, 2016, with the Korean Intellectual Property Office, the disclosure of which is incorporated herein by reference.

TECHNICAL FIELD

The present invention relates to an electric grease barrel pump with an automatic shift function that has a single pumping structure and can supply grease to two or more supply targets under different supply conditions, and an operation therefor is automatically performed by a manual operation of a valve for switching a grease supply line.

BACKGROUND ART

In general, grease is a kind of lubricant that is supplied to form an oil film between components of a rotation part, such as a roller or a bearing, subjected to a large load. Such grease is supplied in a semi-solid state, turns into a liquid state by pressure and heat when a machine is operated, and changes into the semi-solid state again when the machine is stopped.

If the grease is not supplied between rotation parts of the machine, burn out, seizures or breakage may occur due to friction between components of the rotation parts or between the rotation parts and peripheral devices, so that a worker has to frequently check the amount of grease and replenish the grease sufficiently as necessary.

Such grease has a high viscosity, and a grease gun is mainly used to inject a small amount of grease. However, when it is necessary to inject a large amount of grease, a grease barrel pump is extensively used.

However, in the conventional electric grease barrel pump, different kinds of pumps having different mechanical structures are used in accordance with the application such that the grease discharge amount and discharge pressure corresponding to each application can be exerted.

The present applicant has proposed Korean Patent No. 10-1364760 (invention title: grease supply system for multifunctional excavator) and the present invention is suggested by further improving and developing the above patent.

The above-mentioned "grease supply system for multifunctional excavator" is a type in which grease is discharged at a constant discharge pressure and thus a constant discharge amount, so that it is suitable for equipment that matches the discharge pressure and discharge amount. However, when it is used for another equipment, the equipment may be contaminated when the grease is excessively supplied or the equipment may be burnt out when the grease is insufficiently supplied. Accordingly, the grease supply system is mainly used for equipment that matches the discharge pressure and discharge amount and is secondarily used for equipment requiring relatively high discharge pressure and relatively high discharge amount by supplying the grease for a relatively long period of time.

Document of Related Art

[Patent Document]
(Patent document 1) Korean Registered Patent Publication No. 10-1364760(issued on Feb. 20, 2014), "grease supply system for multifunctional excavator"
(Patent document 2) Korean Registered Patent Publication No. 10-0918594 (issued on Sep. 24, 2009), "electric metering pump apparatus"

DISCLOSURE

Technical Problem

An embodiment of the present invention provides an electric grease barrel pump with an automatic shift function that has a single pumping structure and can supply grease to two or more supply targets under different supply conditions, and an operation therefor is automatically performed by a manual operation of a valve for switching a grease supply line.

Technical Solution

An electric grease barrel pump with an automatic shift function according to an embodiment of the present invention includes a pumping device for supplying grease, a driving device for driving the pumping device, a supply pipe through which the grease is discharged from the pumping device, a check valve for preventing the grease in the supply pipe from flowing back toward the pumping device, a distribution valve installed at an end of the supply pipe in a discharging direction of the grease to supply the grease to any one of a plurality of grease supply targets, a magnetic switch installed at a movable portion of the distribution valve to output a signal for supplying the grease to a selected grease supply target of the plurality of grease supply targets according to an operating position of the movable portion, a recovery pipe installed between the pumping device and the supply pipe to allow the grease to be recovered to the pumping device; a relief valve installed in the recovery pipe, and a control unit for controlling an operation of the driving device to adjust grease discharge capability of the pumping device according to the signal of the magnetic switch.

The distribution valve may be constituted by a manual valve, the movable portion may include a manual operation handle, and the magnetic switch may output a signal for supplying the grease to a selected grease supply target among the grease supply targets in accordance with an operated position of the manual operation handle.

The manual operation handle may include a seesaw type manual operation handle, and the magnetic switch may be configured to transmit different contact signals to the control unit according to a position change of the seesaw type manual operation handle.

The driving device may include an electric motor, and the control unit may control the driving device by adjusting an RPM of the electric motor in accordance with the contact signal of the magnetic switch.

The pumping device may include a tank for receiving the grease, a pressing plate sliding along an inside of the tank, a cylinder formed at a lower portion thereof with an inlet port to allow the grease below the pressing plate to be introduced into the inlet port and formed at an upper portion thereof with an outlet port for discharging the grease introduced through the inlet port wherein a block is provided at an upper portion of the inlet port, a piston configured to move up and down along an inner peripheral surface of the cylinder, formed therein with a flow path through which the grease flows, and provided with a stopper restrained upward by the block. The driving device may be configured to move up and down the piston of the pumping device, and a lower end of the recovery pipe may communicate with a lower portion of the pressing plate.

Advantageous Effects

According to an embodiment of the present invention, grease can be supplied to two or more supply targets through one electric grease barrel pump having a single pumping structure under different supply conditions, and an operation therefor can be automatically performed by a manual operation of a valve for switching a grease supply line so that the structural efficiency of the electric grease barrel pump can be improved and convenience of use and functionality of the electric grease barrel pump can be enhanced.

BEST MODE

Figure 1:
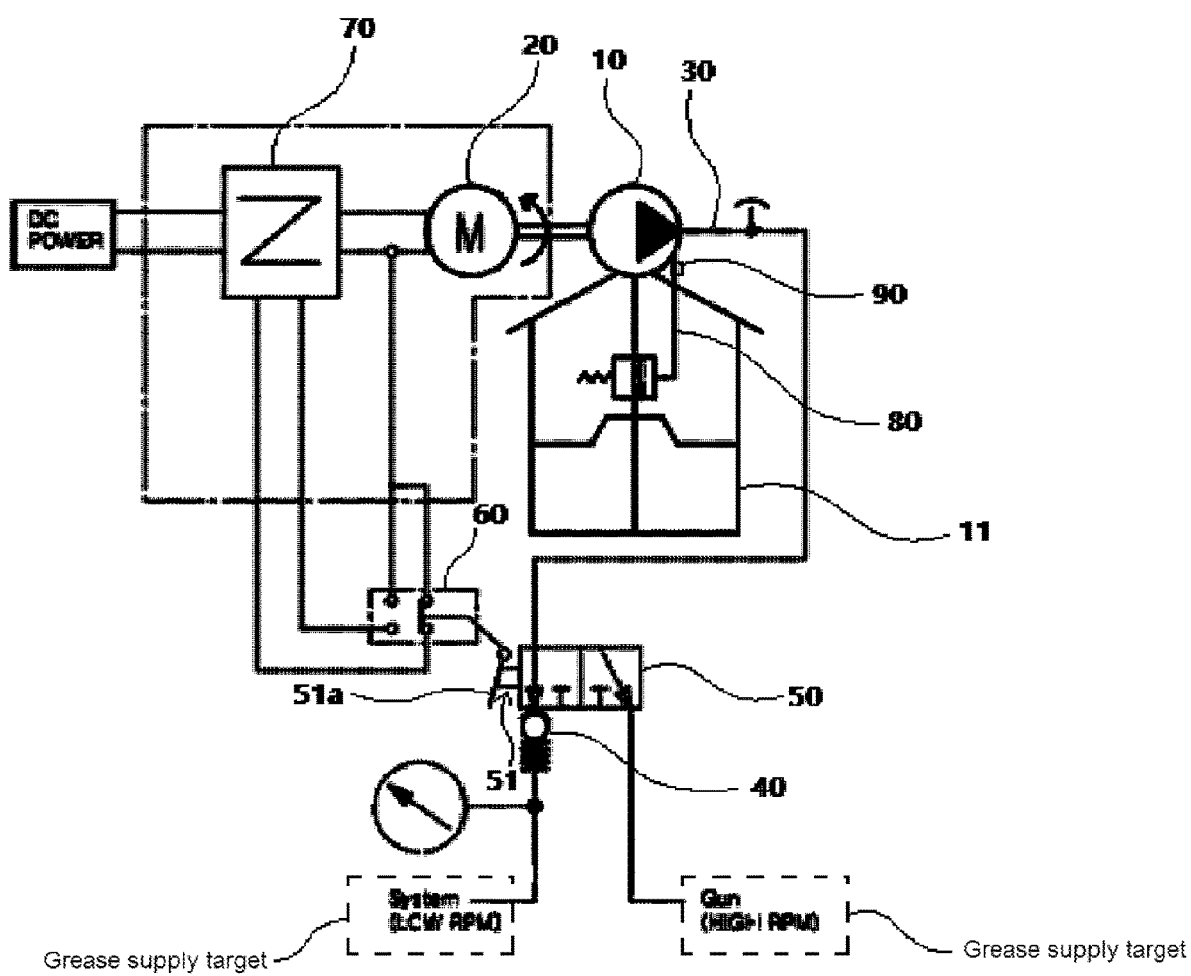
FIG. 1 is a view showing a configuration of an electric grease barrel pump with an automatic shift function according to one embodiment of the present invention.

The following detailed description of the present invention is provided to allow those skilled in the art to replicate the present invention, and an exemplary embodiment of the present invention will be described with reference to accompanying drawings hereinafter. Hereinafter, the embodiments will be described in detail so that those skilled in the art can sufficiently replicate the present invention. It should be understood that various embodiments of the present invention is mutually different from each other, and not mutually exclusive. For example, specific shapes, structures, and features disclosed herein can be realized in the form of other embodiments falling within the scope of the present invention. The position or the arrangement of individual components in the disclosed embodiments can be modified within the technical spirit and scope of the present invention.

Accordingly, the following detailed description is not interpreted with limited meanings. If the scope of the present invention can be properly explained, the scope of the present invention is limited by attached claims and equivalents of the claims. Like elements having like reference numerals has the same functions or like functions in various aspects.

Terminologies used in this specification are selected from general terminologies by taking the functions thereof into consideration and they may vary depending on the intents of a user or an operator or precedents thereof. In addition, in the specific case, the applicant can coin new words. In this case, the new words will be defined in detail in the detailed description of the present invention. Accordingly, the terminologies used in this specification should be defined based on the substantial meanings thereof and the whole context throughout the present specification.

In the following description of the present invention, when a predetermined part "includes" a predetermined component, the predetermined part does not exclude other components, but may further include other components unless otherwise indicated. In addition, terms "part" and "module" means a unit to perform at least one function or operation, which can be implemented in hardware or software, or the combination of hardware and software.

An electric grease barrel pump with an automatic shift function according to an embodiment of the present invention will be described with reference to FIGS. 1 to 3.

FIG. 1 is a view showing a configuration of an electric grease barrel pump with an automatic shift function according to one embodiment of the present invention.

As shown in the drawing, an electric grease barrel pump having an automatic shift function according to an embodiment of the present invention includes a pumping device 10, a driving device 20, a supply pipe 30, a check valve 40, a distribution valve 50, a magnetic switch 60, a recovery pipe 80, a relief valve 90, and a control unit 70.

The pumping device 10 is driven by the driving device 20 to supply grease which will be described later, and the pumping device 10 and the driving device 20 will be described with reference to FIGS. 2 and 3.

Figure 2:
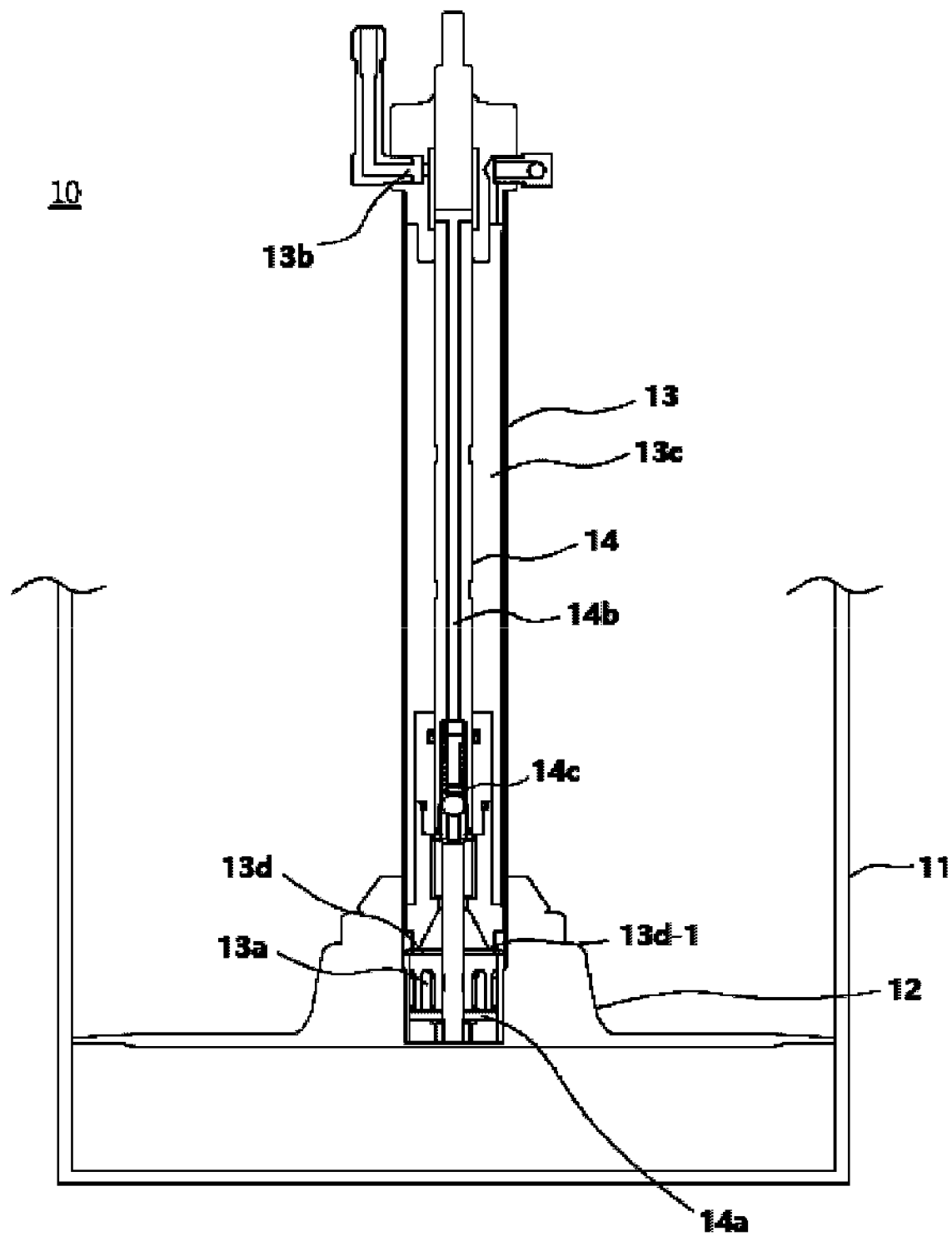
FIG. 2 is a sectional view showing a state in which a piston of a pumping device is located at a bottom dead center in an electric grease barrel pump with an automatic shift function according to one embodiment of the present invention.
Figure 3:
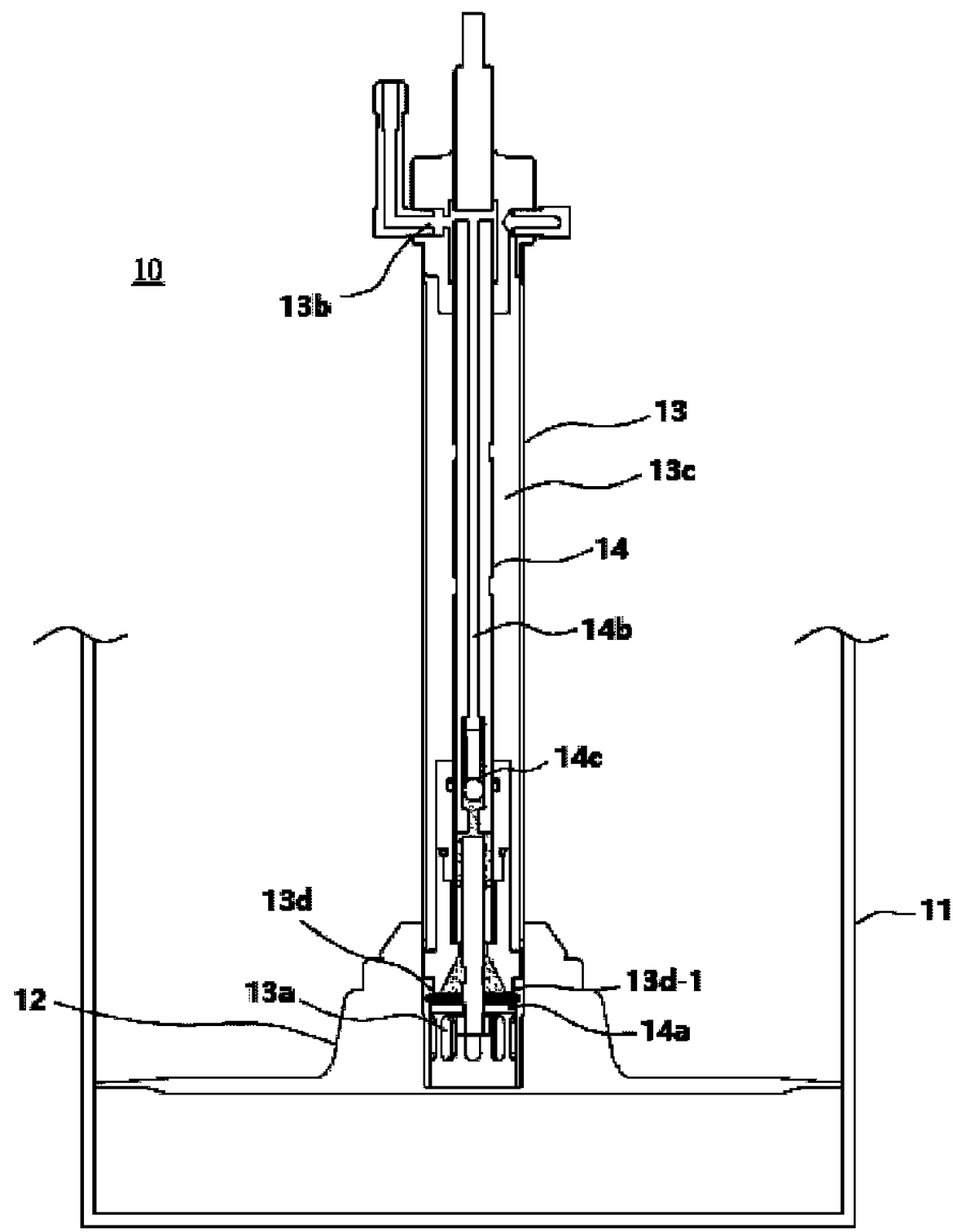
FIG. 3 is a sectional view showing a state in which a piston of a pumping device is located at a top dead center in an electric grease barrel pump with an automatic shift function according to one embodiment of the present invention.

FIG. 2 is a sectional view showing a state in which a piston of the pumping device is located at a bottom dead center in the electric grease barrel pump with an automatic shift function according to one embodiment of the present invention, and FIG. 3 is a sectional view showing a state in which the piston of the pumping device is located at a top dead center in the electric grease barrel pump with an automatic shift function according to one embodiment of the present invention.

As shown in the drawings, the pumping device 10 includes a tank 11, a pressing plate 12, a cylinder 13, and a piston 14.

The tank 11 receives grease and has a cylindrical shape to facilitate the sliding movement of the pressing plate 12, which will be described later.

The pressing plate 12 is configured to move up and down from an inside of the tank 11 and may be formed to be gradually inclined downward in the radial direction so that the grease around the tank 11 can be gathered at the center and discharged to the outside. In addition, a rim of the pressing plate 12 comes in close contact with an inner peripheral surface of the tank 11 to prevent contaminants from penetrating into a lower portion of the pressing plate 12.

The cylinder 13 is configured to pass through the pressing plate 12 in the vertical direction. An inlet port 13a is formed at a lower portion of the cylinder 13 so that the grease can be introduced into the cylinder 13 and an outlet port 13b is formed at the upper portion of the cylinder 13 to discharge the grease. In addition, a hollow 13c is formed in the cylinder 13 so that the piston 14 can vertically move up and down and a block 13d is formed at an upper portion of the inlet port 13a for restraining the movement of a stopper 14a of the piston 14, which will be described later. The block 13d is formed with an opening 13d-1 so that the pressurized grease can flow into a fluid path 14b of the piston 14.

The piston 14 is configured to move up and down along the inner surface of the cylinder 13 and the fluid path 14b is formed in the piston 14 so that the grease can flow into the piston 14. A ball check 14c is provided so that the grease flowing into the fluid path 14b of the piston 14 flows only upward. In addition, the piston 14 is provided at a lower portion thereof with the stopper 14a for restraining the up/down movement of the piston 14 by the block 13d of the cylinder 13. The stopper 14a may have a disk shape.

Referring back to FIG. 1, the driving device 20 drives the pumping device 10, that is, the grease is discharged through the flow paths the driving device 20 moves the piston 14 of the pumping device 10 up and down. In the present embodiment, the driving device 20 includes an electric motor, however, the present invention is not limited thereto. The driving device 20 may include various elements such as a hydraulic motor, an LM guide, or the like.

The supply pipe 30 is configured to communicate with the pumping device 10 so that the grease supplied into the supply pipe 30 through the pumping device 10 can be supplied to places requiring the grease. In other words, the supply pipe 30 communicates with the outlet port 13b formed in the cylinder 13 of the pumping device 30. In this case, the outlet port 13b communicating with the supply pipe 13 may be detachably attached through a screw coupling.

The check valve 40 is installed in the supply pipe 30 to prevent the grease from flowing back toward the pumping device 10.

The distribution valve 50 is installed at an end portion of the supply pipe 30 in the discharge direction of the grease so that the grease is supplied to one of a plurality of grease supply targets.

The distribution valve 50 may include a ⅔ way valve and may include a manual valve in which a movable portion 51 for switching the discharge direction of the grease is manually manipulated. Thus, the movable portion 51 of the distribution valve 50 may include a manual operation handle 51a.

The magnetic switch 60 is installed on the movable portion of the distribution valve 50 and functions to output a signal for supplying the grease to a selected grease supply target in accordance with the operating position of the movable portion 51.

According to the present embodiment, the magnetic switch 60 outputs a signal to supply the grease to the selected grease supply target among the grease supply targets in accordance with the operated position of the manual operation handle 51a included in the movable portion 51 of the distribution valve 50. In addition, the manual operation handle 51a included in the movable portion 51 of the distribution valve 50 may include a seesaw type manual operation handle and the magnetic switch 60 may output different signals having different contact points according to the position change of the seesaw type manual operation handle. In other words, the magnetic switch 60 may transmit different signals having different contact points to the control unit 70, which will be described below, according to the position change of the manual operation handle 51a. In other words, the magnetic switch 60 may be configured to transmit different contact signals to the control unit 70, which will be described later, according to the seesaw type position change of the manual operation handle 51a.

The control unit 70 controls the operation of the driving device 20 so that the grease discharge capability of the pumping device 10 can be adjusted in accordance with the signal of the magnetic switch 60. According to the present embodiment, the control unit 70 adjusts an RPM of an electric motor serving as the driving device 20 in accordance with the contact signal of the magnetic switch 60 so that the grease discharging capability of the pumping device 10 can be adjusted.

The recovery pipe 80 is installed between the pumping device 10 and the supply pipe 30 to allow the grease to be recovered to the pumping device 10. Referring to FIGS. 2 and 3, the recovery pipe 80 may be configured such that a lower end thereof communicates with a lower portion of the pressing plate 12 of the pumping device 10.

Referring back to FIG. 1, the relief valve 90 is installed in the recovery pipe 80.

As can be understood from the above description with reference to FIGS. 1 to 3, the electric grease barrel pump with an automatic shift function according to the present invention can supply the grease to two or more supply targets through a single pumping structure under different supply conditions, and an operation therefor can be automatically performed by manually operating the manual operation handle of the distribution valve so that the structural efficiency of the electric grease barrel pump can be improved and convenience of use and functionality of the electric grease barrel pump can be enhanced.

Although an exemplary embodiment of the disclosure has been described based on specific matters such as detailed elements, limited embodiments, and drawings for illustrative purposes, those skilled in the art will appreciate that the disclosure is not limited to the above embodiments, and various modifications, additions and substitutions are possible, without departing from the scope and spirit of the invention as disclosed in the accompanying claims.

Accordingly, the spirit of the present invention is not limited to the above-described embodiments, but attached claims, and equivalents and modifications thereof fall within the scope of the present invention.

| [Description of Reference Numerals] | |
|---|---|
| 10: pumping device | 11: tank |
| 12: pressing plate | 13: cylinder |
| 13a: inlet port | 13b: outlet port |
| 13c: hollow | 13d: block |
| 13d-1: opening | 14: piston |
| 14a: stopper | 14b: fluid path |
| 14c: ball check | 20: driving device |
| 30: supply pipe | 40: check valve |
| 50: distribution valve | 51: movable portion |
| 51a: manual operation handle | 60: magnetic switch |
| 70: control unit | 80: recovery pipe |
| 90: relief valve | |

The invention claimed is:

1. An electric grease barrel pump comprising:
a pumping device for supplying grease;
a driving device for driving the pumping device;
a supply pipe through which the grease is discharged from the pumping device;
a check valve for preventing the grease in the supply pipe from flowing back toward the pumping device;
a distribution valve installed at an end of the supply pipe in a discharging direction of the grease to supply the grease to any one of a plurality of grease supply targets;
a magnetic switch installed at a movable portion of the distribution valve to output a signal for supplying the grease to a selected grease supply target of the plurality of grease supply targets according to an operating position of the movable portion;
a recovery pipe installed between the pumping device and the supply pipe to allow the grease to be recovered to the pumping device;

a relief valve installed in the recovery pipe; and a control unit for controlling an operation of the driving device to adjust grease discharge capability of the pumping device according to the signal of the magnetic switch, wherein the driving device includes an electric motor, and the control unit controls the driving device by adjusting an RPM of the electric motor in accordance with the signal of the magnetic switch, wherein the electric grease barrel pump is a single pumping structure that has an automatic shift function where the pump is configured to automatically supply the grease to the plurality of grease supply targets under different supply conditions.

2. The electric grease barrel pump of claim 1, wherein the distribution valve is constituted by a manual valve, the movable portion includes a manual operation handle, and the magnetic switch outputs a signal for supplying the grease to a selected grease supply target among the grease supply targets in accordance with an operated position of the manual operation handle.

3. The electric grease barrel pump of claim 2, wherein the manual operation handle includes a seesaw type manual operation handle, and the magnetic switch is configured to transmit different contact signals to the control unit according to a position change of the seesaw type manual operation handle.

4. The electric grease barrel pump of claim 1, wherein the pumping device includes a tank for receiving the grease, a pressing plate sliding along an inside of the tank, a cylinder formed at a lower portion thereof with an inlet port to allow the grease below the pressing plate to be introduced into the inlet port and formed at an upper portion thereof with an outlet port for discharging the grease introduced through the inlet port wherein a block is provided at an upper portion of the inlet port, a piston configured to move up and down along an inner peripheral surface of the cylinder, formed therein with a flow path through which the grease flows, and provided with a stopper restrained upward by the block, the driving device including the electric motor is located outside of the pumping device and configured to move the piston of the pumping device up and down, and a lower end of the recovery pipe communicates with a lower portion of the pressing plate.

* * * * *